(12) United States Patent
Harris et al.

(10) Patent No.: US 7,002,325 B2
(45) Date of Patent: Feb. 21, 2006

(54) CLOCKED CASCADING CURRENT-MODE REGULATOR WITH HIGH NOISE IMMUNITY AND ARBITRARY PHASE COUNT

(75) Inventors: Matthew B. Harris, Durham, NC (US); Michael M. Walters, Apex, NC (US)

(73) Assignee: Intersil Americas Inc., Milpitas, CA (US)

( * ) Notice: Subject to any disclaimer, the term of this patent is extended or adjusted under 35 U.S.C. 154(b) by 63 days.

(21) Appl. No.: 10/747,833

(22) Filed: Dec. 29, 2003

(65) Prior Publication Data

US 2005/0083024 A1   Apr. 21, 2005

Related U.S. Application Data

(60) Provisional application No. 60/512,735, filed on Oct. 20, 2003.

(51) Int. Cl.
   *G05F 1/40* (2006.01)

(52) U.S. Cl. .................................................. 323/272

(58) Field of Classification Search ................ 323/272, 323/282, 224, 283
See application file for complete search history.

(56) References Cited

U.S. PATENT DOCUMENTS

| | | | | |
|---|---|---|---|---|
| 6,043,634 A | * | 3/2000 | Nguyen et al. | 323/272 |
| 6,218,815 B1 | * | 4/2001 | Kates et al. | 323/272 |
| 6,366,069 B1 | * | 4/2002 | Nguyen et al. | 323/282 |
| 6,448,746 B1 | * | 9/2002 | Carlson | 323/272 |
| 6,628,106 B1 | * | 9/2003 | Batarseh et al. | 323/222 |

* cited by examiner

*Primary Examiner*—Shawn Riley
(74) *Attorney, Agent, or Firm*—Allen, Dyer, Doppelt, Milbrath & Gilchrist P.A.

(57) ABSTRACT

A clocked cascadable power regulator including synchronization logic and PWM control logic. The synchronization logic receives a clock signal and asserts a digital output signal synchronized with the clock signal in response to assertion of a digital input signal. The PWM control logic controls a PWM cycle in response to the digital input signal and in response to an output control condition. The regulator may be used alone or cascaded with other similar regulators for implementing a multiphase power converter with multiple channels. The clocked cascadable regulator uses digital signals to communicate between channels. Digital signals are not prone to the same kind of signal degradation or noise susceptibility as analog signals. In the cascaded configuration, there is one clock common to all channels which ensures that the phase separation between the channels is symmetrical to within the jitter tolerance of the common clock.

12 Claims, 4 Drawing Sheets

CLOCKED CASCADING CURRENT-MODE REGULATOR WITH HIGH NOISE IMMUNITY AND ARBITRARY PHASE COUNT

CROSS-REFERENCE TO RELATED APPLICATIONS

This application claims the benefit of U.S. Provisional Application No. 60/512,735 filed on Oct. 20, 2003, which is herein incorporated by reference for all intents and purposes.

BACKGROUND OF THE INVENTION

1. Field of the Invention

The present invention relates to PWM power regulators and/or multi-phase DC-DC converters, and more particularly to a clocked cascading current-mode regulator with high noise immunity and arbitrary phase count.

2. Description of the Related Art

Multi-phase power conversion and current-mode control are commonly used methods for DC-DC power conversion for the electronic market. Multi-phase power conversion provides a cost-effective power solution when load currents are too high to be easily supported by single-phase converters. The switching of each channel is timed to be symmetrically out of phase with each of the other channels. The multi-phase approach offers cost-saving advantages with improved response time, superior ripple cancellation, and improved thermal distribution.

The electronic market has evolved, however, to the point that the number of phases required in a multi-phase power regulator exceeds the number that a single integrated circuit (IC) can practically support. As the phase count grows above four, the IC package becomes large, and the spacing between the power-delivery point and the controller IC exceeds the distance that can accurately support low-level signal integrity and noise rejection. Signal problems result in inaccuracy and necessitate added expense in terms of extra components to suppress noise, layout constraints, and reduced phase count.

Prior methods attempt to solve the excessive package size problem (which is only part of the overall problem) by cascading multiple current-mode regulators. In one case, a separate controller IC generates a triangle-shaped signal common to all of the current-mode regulators. Each of the current-mode regulators initiates its cycle at a different, programmable point on the triangle-shaped signal in an attempt to achieve the necessary phase separation between the different channels. Correct phase separation between the different channels is an important component to multiphase power conversion necessary for ripple cancellation.

Other problems remain unsolved by prior solutions. The triangle-shaped signal is an analog signal, and is therefore subject to signal degradation and noise interference. Thus the prior method is constrained in terms of the physical separation of the different channels. The noise generated by one channel switching corrupts the triangle-shaped signal reaching the other channels, which limits the time separation between two channels to some value necessary to allow the noise to dissipate between noise generating events and switching decision points. Since the time separation between the channels is limited, so is the phase count and/or switching frequency.

It is desired to provide a multiphase converter with a relatively large number of channels without compromising signal integrity and noise rejection and without added expense in terms of layout constraints and extra components to suppress noise.

SUMMARY OF THE INVENTION

A clocked cascadable power regulator according to an embodiment of the present invention includes synchronization logic and PWM control logic. The synchronization logic receives a clock signal and asserts a digital output signal synchronized with the clock signal in response to assertion of a digital input signal. The PWM control logic controls each PWM cycle in response to the digital input signal and an output control condition. The regulator may be used alone or cascaded with other similar regulators for implementing a multiphase power converter with multiple channels. The clocked cascadable regulator uses digital signals to communicate between channels. Digital signals are not prone to the same kind of signal degradation or noise susceptibility as analog signals. In the cascaded configuration, there is one clock common to all channels which ensures that the phase separation between the channels is symmetrical to within the jitter tolerance of the common clock.

The PWM control logic may include PWM logic and feedback sense logic. The PWM logic initiates a PWM cycle in response to the digital input signal and terminates the PWM cycle in response to a reset signal. The feedback sense logic asserts the reset signal when the output control condition is met. The PWM logic may include a latch, gate control logic and at least one driver amplifier. The latch sets in response to the digital input signal and resets in response to the reset signal. The gate control logic provides at least one PWM activation signal. Each driver amplifier is responsive to the one or more PWM activation signal(s). In a particular embodiment, the feedback sense logic includes a sense amplifier and a comparator. In this case, the sense amplifier senses an output current condition and asserts a sense signal. The comparator compares the sense signal with a feedback reference signal to determine the output control condition. The output current condition may be sensed in any suitable manner, such as peak, average or valley current of an output inductor or other sensing component. The synchronization logic may be implemented as cascaded flip-flops responsive to the clock signal and the digital input signal. A weak pull-down device may be included to initially pull-down the digital output signal unless otherwise driven high by a digital output signal from another regulator.

A multiphase power converter according to an embodiment of the present invention includes multiple regulators coupled in a cascade configuration, multiple switching circuits and a controller. Each regulator includes synchronization logic and a PWM control circuit. The synchronization logic receives a clock signal and a digital start input signal from a previous regulator and provides a digital start output signal synchronized with the clock signal to a next regulator in response to the digital start input signal. The PWM control circuit controls a PWM output in response to assertion of the digital start input signal and based on meeting an output condition. Each switching circuit has an input coupled to a PWM output of a corresponding regulator, an output for driving a common DC output voltage, and a sense output provided to a PWM control circuit of the corresponding regulator. The controller senses the DC output voltage and provides a compensation signal to the PWM control circuit of the corresponding regulator and provides the clock signal.

Each switching circuit may include first and second switches, an output inductor and a sense circuit. The switches have current terminals coupled in series at a junction and control inputs coupled to the PWM output of the corresponding regulator. The output inductor is coupled between the junction of the switches and the DC output voltage. In one embodiment, the sense circuit senses current of the output inductor and provides the sense output. The controller may include a sense amplifier, an error amplifier and a clock circuit. The sense amplifier has an input coupled to the DC output voltage and an output that provides an output sense signal. The error amplifier compares the output sense signal with a reference signal and provides the compensation signal. The clock circuit generates the common clock signal. For N regulators coupled in a daisy-chain configuration, a selected switching frequency FSW is achieved by programming the clock signal with a frequency of N*FSW. A pull-up device may be included to initially pull high a digital start input signal of one of the regulators.

A method of controlling each of multiple clocked cascadable regulators of a multiphase converter according to an embodiment of the present invention includes coupling a digital output of each regulator to a digital input of another regulator, providing a common clock signal to a clock input of each regulator, providing a digital output signal on the digital output synchronized with the common clock signal in response to receiving a digital input signal at the digital input, and controlling a PWM cycle in response to receiving the digital input signal and in response to an output condition.

The method may further include programming a switching frequency FSW of the multiphase converter with N regulators by programming the frequency of the common clock signal to N*FSW. The method may further include detecting an output current condition and generating a sense signal, and comparing the sense signal with a compensation signal. The detecting an output current condition may include detecting peak current through an output inductor. The method may further include providing a central controller that senses an output voltage condition and that provides the compensation and clock signals to each regulator.

BRIEF DESCRIPTION OF THE DRAWING(S)

The benefits, features, and advantages of the present invention will become better understood with regard to the following description, and accompanying drawing in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

A clocked cascadable current-mode regulator according to an embodiment of the present invention uses only two digital signals to communicate between channels. The current-mode regulator may be used alone or cascaded with other similar regulators for implementing a multiphase power converter with multiple channels. As used herein, the term "converter" is used to denote a cascaded configuration of multiple "regulators", where it is understood that such terms are general in nature and are typically interchangeable. Digital signals are not prone to the same kind of signal degradation or noise susceptibility as analog signals, so there is no practical limit to the number of phases nor the physical separation between the regulators. A separate controller is provided in a control feedback loop to monitor the load and control the regulators. Furthermore, there is one clock common to all channels which ensures that the phase separation between the channels is symmetrical to within the jitter tolerance of the common clock.

Figure 1:
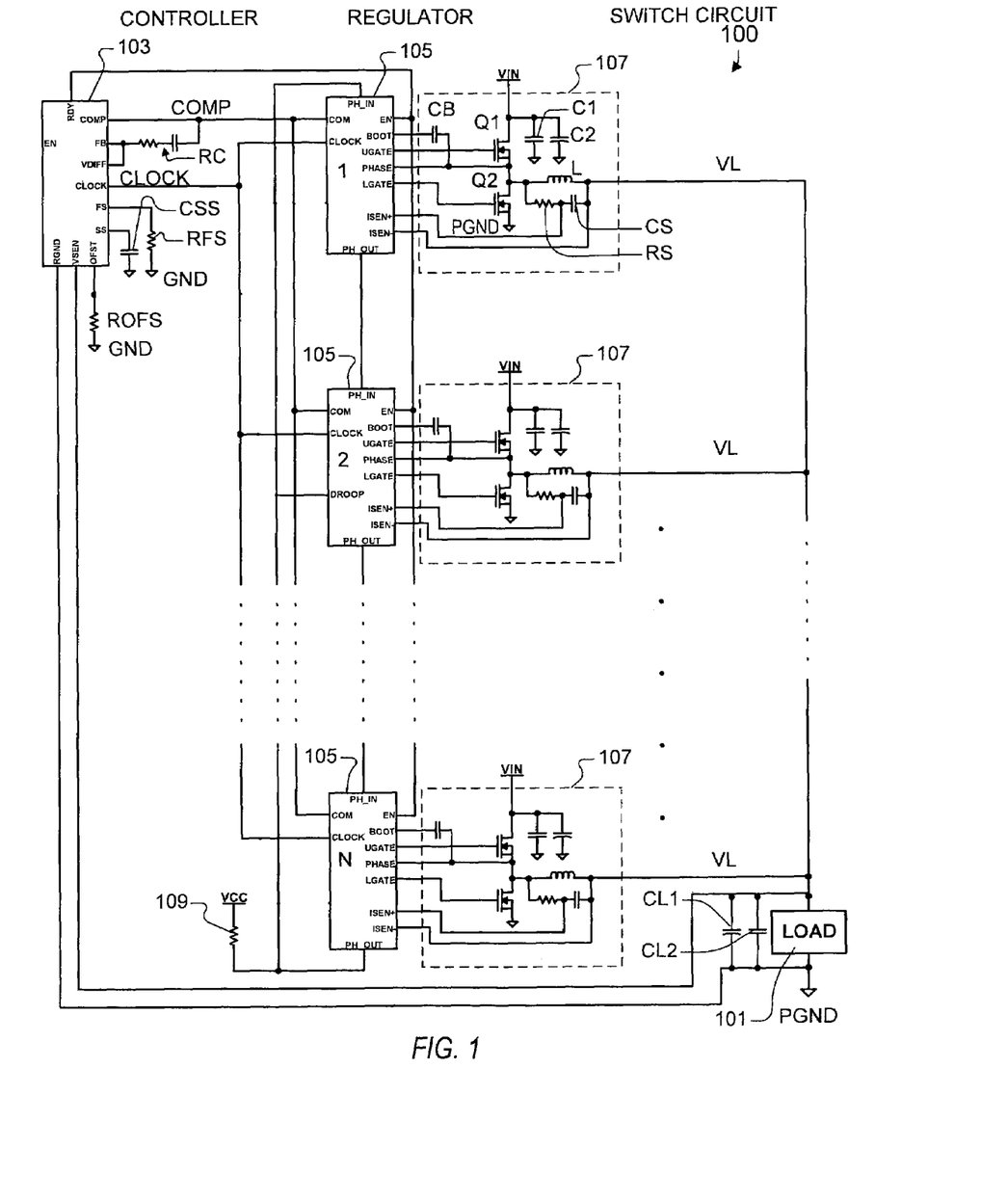
FIG. 1 is a schematic diagram of a multi-phase DC-DC converter according to an exemplary embodiment of the present invention.

FIG. 1 is a schematic diagram of a multi-phase DC-DC converter 100 according to an exemplary embodiment of the present invention. The converter 100 develops a load voltage VL provided to a load 101 referenced to a power ground (PGND) signal. A couple of load capacitors CL1 and CL2 are coupled between VL and PGND near the load 101. The VL signal is fed back to a voltage sense (VSEN) pin of a controller 103, having a return ground (RGND) pin coupled to PGND via a conductive trace or signal line. The term "pin" is used to reference a connection to a device, where the connection may be an input, an output or both (generally, an input/output or I/O connection). The controller 103 and each of the regulators 105 may each be implemented on separate chips or ICs with corresponding I/O pins, although discrete implementations are also contemplated. The controller 103 has a COMP pin providing a COMP signal, which is provided to a COM pin of one or more current-mode regulators 105 coupled in a cascade configuration. In the configuration shown, there are N regulators 105 (individually numbered from 1 to N where N is any positive integer).

The controller 103 has a CLOCK pin providing a CLOCK signal to a CLOCK input pin of each of the regulators 105. The controller 103 includes a pin FS coupled to one end of a resistor RFS, having its other end coupled to signal ground GND. As described further below, the frequency of the CLOCK signal is inversely proportional to the resistance of the resistor RFS. The controller 103 has a ready pin RDY coupled to an enable (EN) input pin of each of the regulators 103. The controller 103 includes an offset (OFST) pin coupled to one end of an offset resistor ROFS, which has its other end coupled to GND. A series-coupled resistor-capacitor (RC) circuit has one end coupled to the COMP pin and another end coupled to a feedback (FB) pin and to a VDIFF pin of the controller 103. The controller 103 includes a soft-start (SS) pin coupled to one end of a soft-start capacitor CSS, which has its other end coupled to GND. The controller 103 also includes an enable pin EN for externally enabling the functions of the controller 103.

Each regulator 105 has a phase input (PH_IN) pin and a phase output (PH_OUT) pin. In accordance with the cascade configuration, the PH_IN pin of each regulator 105 is coupled to the PH_OUT pin of a preceding regulator, and the sequence continues until the PH_OUT pin of the last regulator, numbered N (for channel N), is coupled to the PH_IN pin of the first regulator, numbered 1 (for channel 1). Each regulator 105 asserts a digital signal on its PH_OUT pin, which is provided to the next regulator 105 in the ring or daisy-chain configuration. The CLOCK signal from the controller 103 provided to each of the regulators is also a digital signal. Digital signal control provides superior signal integrity as compared to prior methods which employ analog signals. Each regulator 105 regulates an individual channel of the converter 100 and incorporates a driver circuit that drives a corresponding one of N PWM switch circuits 107 that collectively develop of the VL signal. In the embodiment shown, a weak pull-up resistor 109 is coupled between a voltage source VCC and the PH_IN pin of the first regulator 105 (e.g., channel 1). The resistor 109 provides a means to designate the first channel in the cascaded sequence (e.g., channel 1), as described further below.

Each regulator 105 includes an interface to a corresponding one of the switch circuits 107. Only one switch circuit 107 is described, where it is understood that each of the N switch circuits 107 are substantially the same. Each regulator 105 includes bootstrap (BOOT) pin, an upper gate (UGATE) pin, a phase (PHASE) pin, and lower gate (LGATE) pin and a differential current sense input including a negative polarity current sense (ISEN−) pin and a positive polarity current sense (ISEN+) pin. A bootstrap capacitor CB is coupled between the BOOT and PHASE pins. The UGATE output pin is coupled to the gate of a first switch Q1 and the LGATE output pin is coupled to the gate of a second switch Q2. In the embodiment shown, the switches Q1 and Q2 are implemented as N-channel metal-oxide semiconductor, field-effect transistors (MOSFETs), although other types of switches are contemplated including semiconductor switches suitable for IC fabrication. A power source voltage VIN is provided to the drain of Q1, having its source coupled to the PHASE pin of the regulator 105 and to the drain of Q2. The source of Q2 is coupled to the power ground PGND. The VIN source voltage is typically twelve volts (12 V), although other voltage levels are contemplated.

The PHASE pin from a corresponding one of the regulators 105 is provided to one end of an output inductor L and to one end of a sense resistor RS. The other end of the sense resistor RS is coupled to the ISEN+ pin and to one end of a sense capacitor CS. The other end of the sense capacitor CS is coupled to the ISEN− pin of the regulator 105, and to the other end of the output inductor L, which develops the VL signal. In this manner, the output side of each output inductor L of each of the switch circuits 107 is coupled together at VL and to the ISEN− pin of each regulator 105. The output inductor L is configured in any suitable fashion as known to those skilled in the art, such as an individual inductor, a primary inductor of a transformer, an inductor with a core, etc. As previously described, each regulator 105 includes a CLOCK pin receiving the CLOCK signal from the controller 103, a COM pin receiving the COMP signal from the controller 103, and an EN pin coupled to the RDY pin of the controller 103.

Figure 2:
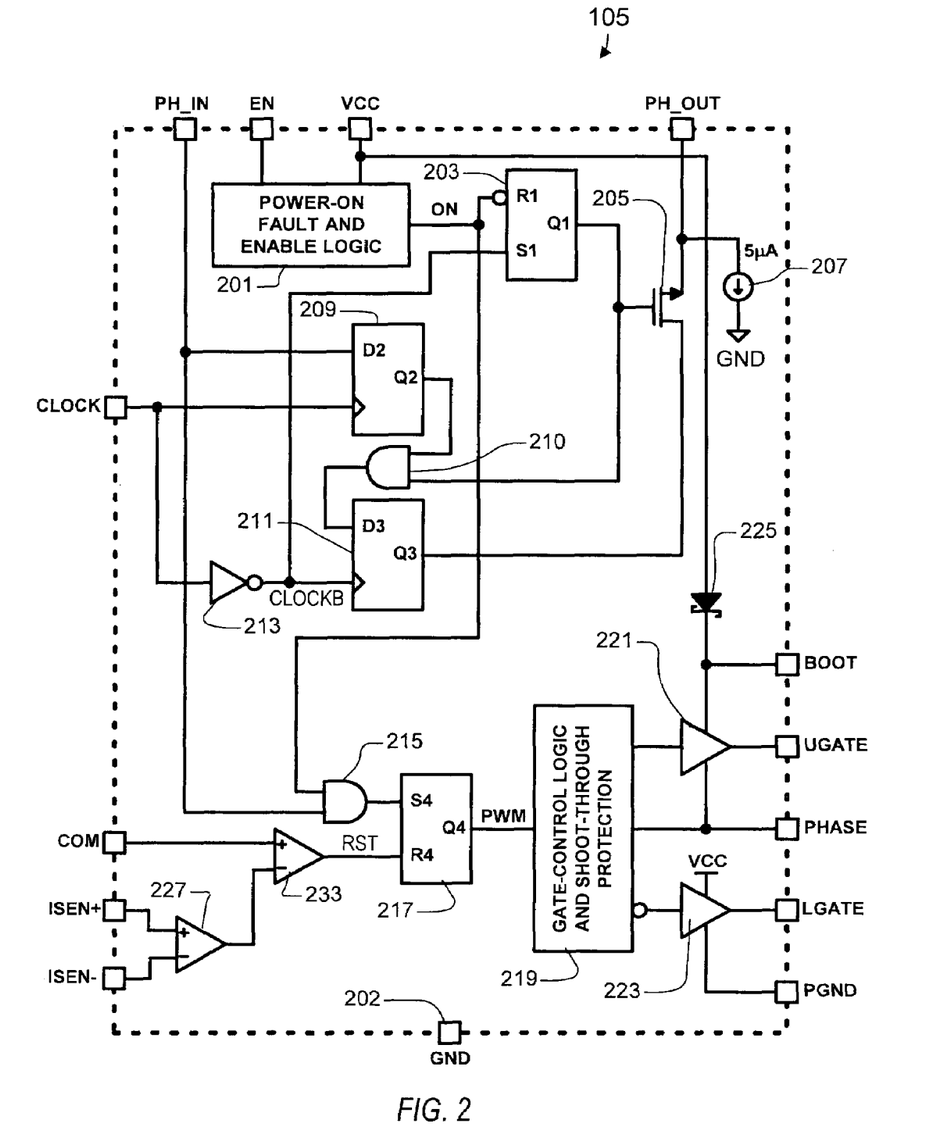
FIG. 2 is a schematic and block diagram of an exemplary embodiment of each of the current-mode regulators of FIG. 1.

FIG. 2 is a more detailed schematic and block diagram of an exemplary embodiment of each of the current-mode regulators 105. The regulator 105 includes a voltage supply input pin VCC referenced to GND via a signal ground GND pin 202. The EN and VCC pins are coupled to power-on fault and enable logic 201, which asserts a start signal ON to the inverted reset input R1 of a latch 203, shown as a set-reset latch, and also to one input of a two input AND gate 215. The R1 input of the latch 203 is inverted so that it is held in reset while the ON signal is low and is released from reset when the ON signal is asserted high by the logic 201. It is noted that any of the latches described herein may be implemented in any suitable or alternative manner, such as latches, flip-flops or storage devices or the like. The Q1 output of the latch 203 is coupled to one input of another two-input AND gate 210 and to the gate of an N-channel FET (NFET) 205, having its source coupled to the PH_OUT pin. A current sink 207 is coupled between the PH_OUT pin and GND and acts as a weak pull-down device to keep the PH_OUT pin pulled low unless otherwise pulled high. Upon initialization (e.g., power-up or reset or otherwise after a fault condition), the logic 201 holds the latch 203 in reset turning off the NFET 205, so that the PH_OUT pin is pulled low by current sink 207 unless otherwise pulled high externally. During normal operation, the ON signal is high and the Q1 output of the latch 203 is high turning on the NFET 205.

The PH_IN pin is provided to the D input, D2, of a D-type flip-flop (DFF) 209 and to the other input of the AND gate 215. It is noted that any of the flip-flops described herein may be implemented in any suitable or alternative manner, such as other flip-flop types, latches or storage devices or the like. The Q2 output of the DFF 209 is coupled to the other input of the AND gate 210, which has its output coupled to the D3 input of another DFF 211. The Q3 output of the DFF 211 is coupled to the drain of the NFET 205. The CLOCK signal is provided to the clock input of the DFF 209 and to the input of an inverter 213. The output of the inverter 213 asserts an inverted clock signal CLOCKB, which is provided to the clock input of the DFF 211 and to the set input S1 of the latch 203.

The output of the AND gate 215 is coupled to the set input S4 of another set-reset latch 217. The Q4 output of the latch 217 generates a pulse-width modulation (PWM) signal, which is provided to an input of gate control logic 219. The gate control logic 219 has a first non-inverting output provided to the input of a first driver amplifier 221 and a second inverting output provided to the input of a second driver amplifier 223. The gate control logic 219 provides pulse-width modulation (PWM) control of the switches Q1 and Q2 and also provides shoot-through protection as understood by those skilled in the art. The VCC pin is coupled to the anode of a Schottky diode 225 and to the positive power input of the amplifier 223. The cathode of the diode 225 is provided to the positive power input of the amplifier 221 and to the BOOT pin. The negative power input of the amplifier 221 is coupled to the PHASE pin and the negative power input a separate power ground pin PGND, which is coupled to the PGND signal. The output of the amplifier 221 is coupled to the UGATE pin and the output of the amplifier 223 is coupled to the LGATE pin of the regulator 105.

The ISEN+ pin is coupled to a non-inverting input of a current sense amplifier 227, having its inverting input coupled to the ISEN− pin. The output of the amplifier 227 is coupled to the inverting input of a comparator amplifier 233. The non-inverting input of the comparator amplifier 233 receives the COMP signal via the COM pin and the output of the comparator amplifier 233 provides a reset signal RST, which is provided to the reset input R4 of the latch 217. The latch 217, the gate control logic 219 and the amplifiers 221 and 223 and supporting circuitry collectively implement PWM logic or a PWM switching circuit suitable for controlling a corresponding switch circuit 107 for PWM operation as known to those skilled in the art. The amplifiers 227 and 233 implement feedback sense logic that asserts a reset signal to the latch 217 when one or more control conditions are met, such as peak output current of an output inductor L or a selected voltage level at the output of the converter 100. The PWM switching circuit may incorporate the feedback sense logic, or the PWM logic and the feedback sense logic collectively forms PWM control logic for controlling PWM operation. The DFFs 209 and 211 and the inverter 213 collectively operate as synchronization logic that asserts the PH_OUT pin after assertion of the PH_IN pin synchronous with the CLOCK signal and after a cycle of the CLOCK signal.

In operation, the power-on fault and enable logic 201 initially holds the ON signal low keeping the latch 203 in reset so that the Q1 output of the latch 203 is held low. The NFET 205 is off and the output of the AND gate 210 is held low keeping the Q3 output of the DFF low. The pull-down device 207 is a weak device that pulls PH_OUT low unless otherwise asserted. The resistor 109 over-rides the pull-down device 207 of the regulator 105 for channel N and pulls PH_OUT(CH N) and PH_IN(CH 1) high. The Q3 output of DFF 211 overrides both the resistor 109 and the pull-down device 207 to drive PH_OUT when the NFET 205 is activated. After the ON signal is asserted high releasing the latch 203 from reset, the latch 203 is set asserting its Q1 output high upon the next rising edge of the CLOCKB signal activating the NFET 205. While the Q1 output of the latch 203 is high, the NFET 205 remains activated and the Q2 output of the DFF 209 determines the state of the D3 input of the DFF 211. While activated, the NFET 205 is effectively transparent and the Q3 output of the DFF 211 drives the PH_OUT pin of the regulator 105. Also, while the ON signal remains high during normal operation, the signal asserted on the PH_IN pin determines the state of the output of the AND gate 215.

A rising edge applied to the PH_IN pin sets the Q4 output of the latch 217 high, which causes the gate control logic 219 to initiate a PWM cycle. In the particular embodiment shown, the gate control logic 219 turns off the amplifier 223 to turn off the switch Q2, and then turns on the amplifier 221 to turn on the switch Q1. Current is provided to the load 101 from VIN via the output inductor L. The controller 103 senses the voltage of the VL signal to develop the appropriate level of the COMP signal provided to the comparator amplifier 233. In an alternative embodiment, the COMP signal may be a static steady state reference signal. The current through inductor L is sensed by amplifier 227, so that when the peak current causes the output of the amplifier 227 to become equal with the COMP signal, the comparator 233 resets the latch 217, which negates the PWM signal to terminate the PWM cycle. In particular, when the Q4 output of the latch 217 is pulled low, the gate control logic 219 turns off the amplifier 221 to turn off the switch Q1 and turns on the amplifier 223 to turn on the switch Q2. The resistor ROFS allows a designer to program a DC offset of a reference signal REF within the controller 103, where the REF signal is further described below.

Meanwhile, the rising edge applied to the PH_IN pin causes the DFF 209 to assert its Q2 output high upon the next rising edge of the CLOCK signal. The high Q2 output of the DFF 209 causes the DFF 211 to assert its Q3 output high on the next falling edge of the CLOCK signal (or the next rising edge of CLOCKB). Assuming the NFET 205 is turned on, the Q3 output of the DFF 211 drives the PH_OUT pin high, which initiates the same sequence of events to initiate a PWM power cycle in the next regulator 105 of the converter 100 in the cascaded configuration. The next regulator 105 initiates its PWM cycle almost immediately after its PH_IN is pulled high synchronous with the CLOCK signal going low, yet the CLOCK signal must go high and then low again for the digital signal to propagate through the DFFs 209 and 211 to the PH_OUT pin of the next device as synchronized by the CLOCK signal. The regulators 105 are activated one at a time in sequential order and repeat in this manner in the ring configuration. For example, the next cycle of regulator number 3 does not start until triggered by the PH_OUT pin from the regulator number 2 and so on. A full cycle occurs when each regulator 105 has received a PH_IN signal and has sent a PH_OUT signal. If the CLOCK signal is operating at a frequency FCL, then the switching frequency FSW of the N-channel multiphase converter 100 is FCL/N, where the forward slash "/" denotes division. In order to obtain a desired switching frequency FSW for N regulators 105, the CLOCK signal is programmed with a frequency of FCL=N*FSW, where an asterisk "*" denotes multiplication.

The power-on fault and enable logic 201, the latch 203, the NFET 205 and the AND gates 210 and 215 form a start-up circuit in each regulator 105 that enables synchronous cascade operation of the PH_OUT pin only after the first negative or falling edge of the CLOCK signal following the PH_IN pin going high. Note that a regulator 105 asserts its PH_OUT high in response to the CLOCK signal going low, so that the PH_IN of the next device is clocked through the DFF 209 upon the next rising edge of CLOCK and then through the DFF 211 upon the following falling edge of CLOCK. Thus, the PH_OUT pin is asserted high one CLOCK cycle after PH_IN is asserted high. Prior to the first pulse of the CLOCK signal, only the first current-mode regulator 105, or channel 1, with its PH_IN signal pulled high by the resistor 109 operates to initiate the round-robin sequence. After that, the PH_OUT signals are enabled one at a time during the first sequence and then the regulators 105 operate normally in sequence thereafter. In the embodiment shown, the converter 100 includes N channels, each implemented with a regulator 105 and corresponding switch circuit 107. The CLOCK signal is programmed with the target frequency FCL to establish the desired FSW for a given number of channels N. Each channel effectively operates in an independent manner, such that an next channel may be activated while the previous channel is still operating to drive the load 101. The CLOCK signal synchronizes operation to provide constant phase separation between the phases and to evenly distribute the load. In this manner, each channel is activated in a synchronous and sequential manner, although each channel deactivates based on its own sense condition(s).

Figure 3:
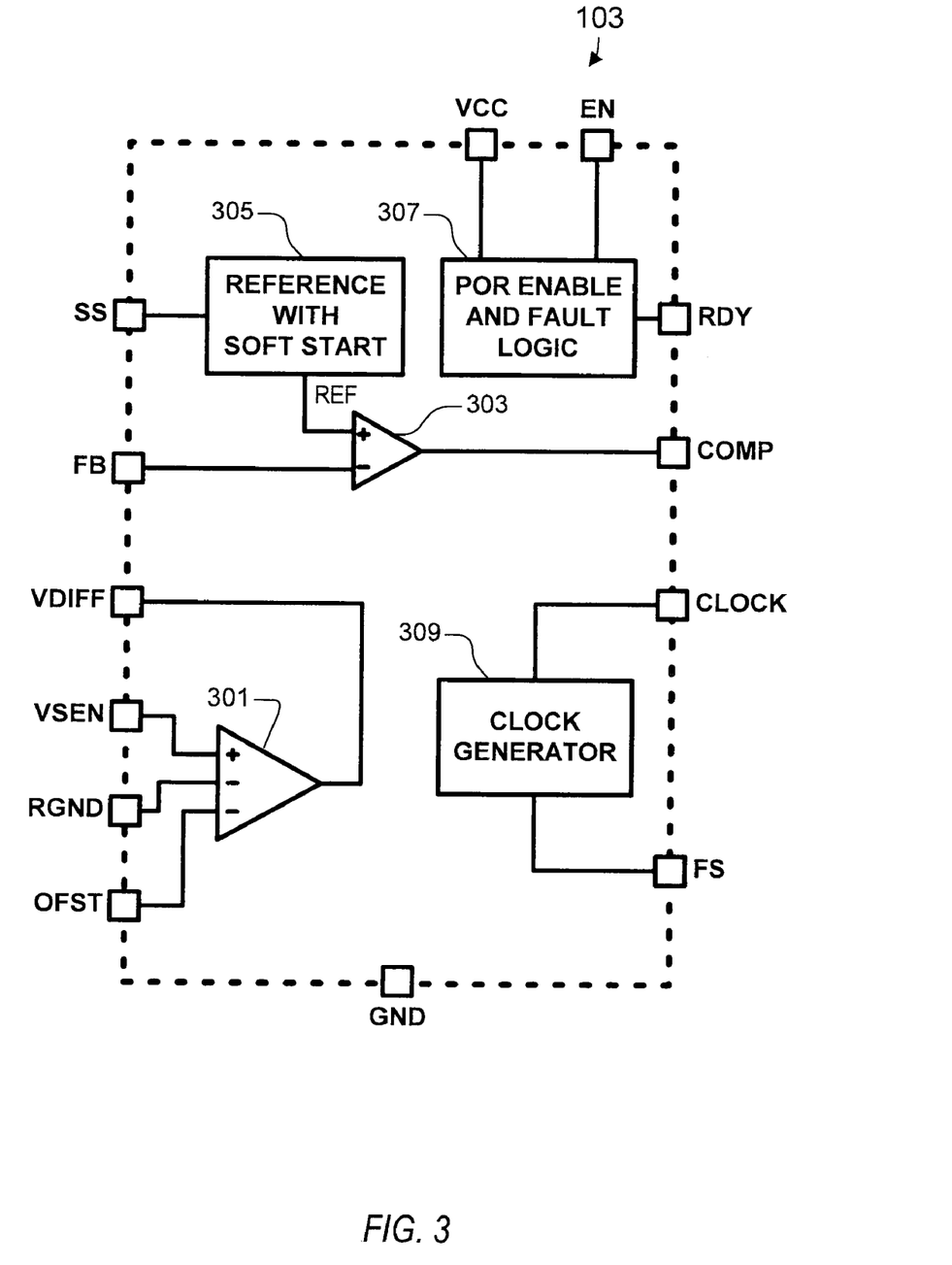
FIG. 3 is a schematic diagram of an exemplary embodiment of the controller of FIG. 1.

FIG. 3 is a schematic diagram of the controller 103 according to an exemplary embodiment of the present invention. In one embodiment, the controller 103 is implemented as a separate chip or IC with VCC and GND pins for coupling to the VCC source voltage and signal ground GND, respectively. The VSEN pin is coupled to the non-inverting input of an amplifier 301, which has an inverting input coupled to the RGND pin. The amplifier 301 senses the load voltage VL and generates an output signal provided to the VDIFF pin. The amplifier 301 also includes another offset input (inverting input) coupled to the OFST pin for enabling external programming of a DC offset of the REF signal via the value of the ROFS resistor. In one embodiment, the amplifier 301 is a differential remote-sense amplifier and may be configured as a unity gain amplifier as known to those skilled in the art. In the embodiment shown, the VDIFF pin is coupled to the FB pin, which is provided to an inverting input of an error amplifier 303. The soft start SS pin is coupled to an input of reference with soft start logic 305, which has an output providing the REF signal to the non-inverting input of the amplifier 303. The output of the error amplifier 303 is coupled to the COMP pin for providing the COMP signal. The capacitor CSS controls a soft start time to initiate PWM operation of the controller 103 as known to those skilled in the art.

The VCC and EN pins are coupled to power-on reset (POR) enable and fault logic 307, which has an output coupled to the RDY pin. After initialization (power up and/or reset) and when the controller 103 is enabled, it asserts the RDY pin high which enables each of the regulators 105. The controller 103 also includes a clock generator 309 which generates the CLOCK signal on the CLOCK pin. The clock generator 309 is also coupled to the resistor RFS via the FS pin. In the embodiment shown, the clock generator 309 places a constant voltage on the FS pin and thus across the resistor RFS connected to the FS pin. The current generated through the resistor RFS flows from the clock generator 309, which produces pulses on the CLOCK signal at a frequency proportional to the current flowing out of the FS pin. In this manner, the frequency of the CLOCK signal, or FCL, is inversely proportional to the resistance value of the resistor RFS. It is understood that other methods may be employed to generate and/or program the frequency of the CLOCK signal as known to those skilled in the art.

Figure 4:
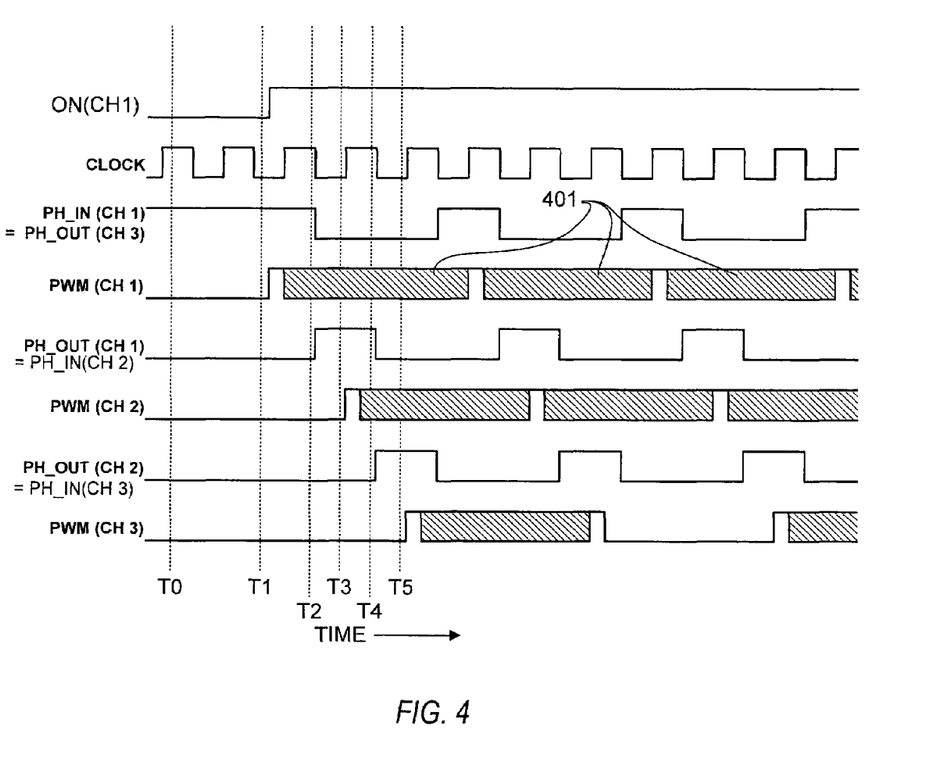
FIG. 4 is a timing diagram illustrating operation of the multi-phase DC-DC converter of FIG. 1 for 3 channels (N=3).

FIG. 4 is a timing diagram illustrating operation of the converter 100 for 3 channels (e.g., N=3). The ON signal for the first channel (CH 1), the CLOCK signal, the PH_IN pin of CH 1 (which is the same as PH_OUT of channel 3 (CH 3), the PWM signal of CH 1, the PH_OUT pin of CH 1 (which is the same as the PH_IN pin of CH 2), the PWM signal of CH2, the PH_OUT pin of CH 2 (which is the same as the PH_IN pin of CH 3), and the PWM signal of CH 3 are plotted versus time. The ON signal is initially low at a time T0 during initialization and is asserted high at a subsequent time T1 to start operations. At time T0, the ON signal is low, the CLOCK signal is oscillating, and the pull-up resistor 109 pulls the PH_IN(CH 1) and PH_OUT(CH 3) pins high. The ON signal goes high at time T1 to start operations, and the PWM signal of CH 1 almost immediately goes high to start a PWM cycle for channel 1 since the ON signal and the PH_IN(CH 1) pin are both high (thus setting the latch 217). Upon the next falling edge of the CLOCK signal at time T2, the PH_IN(CH 1) pin goes low and the PH_OUT(CH 1) pin goes high. Upon the next rising edge of CLOCK at time T3, the PWM signal of channel 2 goes high to initiate a PWM cycle for channel 2. On the next falling edge of CLOCK at time T4, the PH_OUT(CH 1) pin goes low and the PH_OUT (CH 2) pin goes high so that the PWM signal of channel 3 goes high at the next rising edge of CLOCK at time T5 to start a PWM cycle for channel 3.

Operation proceeds in this manner so that the PWM cycle for the next channel starts one CLOCK cycle after the start of the PWM cycle of the prior channel. Shaded regions of the PWM signal for channel 1 and similar shaded regions 401 for the other PWM signals illustrate the termination of the PWM cycle, which depends upon the feedback conditions for each respective channel. For the 3 channel configuration illustrated, each PH_IN pin is asserted high every third falling edge of the CLOCK signal and remains high for one CLOCK cycle. The PWM signal for each channel begins on the next rising edge of CLOCK after assertion of the corresponding PH_IN pin. For the general case for N channels, each PH_IN pin is asserted high every Nth falling edge.

Many variations of the particular embodiment illustrated are possible as would be understood by those skilled in the art. The clock generator 309, for example, may be configured in any manner known to those skilled in the art to provide a suitable CLOCK signal function, either programmable or fixed. For example, the clock generator 309 may alternatively be configured to use a capacitor or other component coupled via the FS pin rather than the resistor RFS. Also, the clock generator 309 may be configured with a fixed delay or otherwise configured with an internally programmable mechanism to program the desired frequency of the clock signal. The exemplary embodiment illustrated detects peak current through the output inductor L as the output control condition to control each PWM cycle. In the peak current method, each PWM cycle is initiated by digital logic and terminated based on the control condition. Many alternatives are possible and contemplated, such as other current methods or methods based on sensing voltage conditions, and the sensing device may be other than current or voltage of the output inductor L. Other current methods include an average current mode or a valley current mode. In a valley current mode, for example, each PWM cycle is initiated by an output control signal associated with low or valley current and terminated by a logic signal or condition. The present invention is not limited by any particular PWM control method.

A clocked cascadable regulator according to embodiments of the present invention provides a low cost method of cascading an arbitrary number of phases in a multi-phase DC-DC converter system. The cascadable regulators are synchronized with two digital signals, including a common clock signal and a cascading digital signal from one regulator to the next. Each regulator includes digitally controlled logic that receives the clock signal and a digital input signal to control each PWM cycle and that generates a digital output signal to control the PWM cycle of the next regulator in the chain of cascaded regulators. The common clock signal synchronizes the channels with each other and ensures consistent phase separation between channels.

The simple digital interfaces provide a significant level of noise immunity as compared to prior methods that employ a common analog signal. Digital signals are not prone to the same kind of signal degradation or noise susceptibility, so that there is no practical limit to the number of phases nor the physical separation between the regulators. The phase count is arbitrary since any number of regulators may be coupled in cascade, as compared to prior techniques having a relatively low phase count. Any suitable target switching frequency FSW is achieved by programming the frequency of the clock signal FCL=N*FSW.

Other benefits are possible, such as unique power savings mode in which any one or more of the regulators may be temporarily suspended or shut down during a low power period. In one power-savings alternative configuration, the clock signal is re-programmed to maintain FSW. This first method requires additional control circuitry to reprogram to frequency of the CLOCK signal. In yet another power-savings alternative configuration, the clock-controlled delay of the suspended devices remain enabled while output switching circuitry is disabled. This second method results in increased ripple voltage since less devices are contributing to the output voltage, but such is considered acceptable since only applied during low-power periods during which ripple is less of a concern. Also, in this second alternative mode, the particular devices that are suspended may be selected to optimize results, such as by suspending every other device resulting in symmetrical output ripple.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention.

What is claimed is:

1. A clocked cascadable power regulator, comprising:
synchronization logic that receives a clock signal and that asserts a digital output signal synchronized with said clock signal in response to assertion of a digital input signal; and
PWM control logic that controls each PWM cycle in response to said digital input signal and an output control condition; and wherein
said PWM control logic comprises
PWM logic that initiates a PWM cycle in response to said digital input signal and that terminates said PWM cycle in response to a reset signal; and
feedback sense logic, coupled to said PWM logic, that asserts said reset signal when said output control condition is met; and wherein
said PWM control logic comprises
a latch that sets in response to said digital input signal and that resets in response to said reset signal;
gate control logic, coupled to said latch, that provides at least one PWM activation signal; and
at least one driver amplifier, each responsive to said at least one PWM activation signal; and wherein
said feedback sense logic comprises
a sense amplifier that senses an output current condition and that asserts a sense signal; and
a comparator that compares said sense signal with a feedback reference signal to determine said output control condition.

2. A clocked cascadable power regulator, comprising:
synchronization logic that receives a clock signal and that asserts a digital output signal synchronized with said clock signal in response to assertion of a digital input signal; and
PWM control logic that controls each PWM cycle in response to said digital input signal and an output control condition; and further comprising
startup logic that disables synchronous cascaded operation during initialization.

3. A clocked cascadable power regulator, comprising:
synchronization logic that receives a clock signal and that asserts a digital output signal synchronized with said clock signal in response to assertion of a digital input signal; and
PWM control logic that controls each PWM cycle in response to said digital input signal and an output control condition; and wherein
said synchronization logic comprises cascaded flip-flops responsive to said clock signal and said digital input signal.

4. A clocked cascadable power regulator, comprising:
synchronization logic that receives a clock signal and that asserts a digital output signal synchronized with said clock signal in response to assertion of a digital input signal; and
PWM control logic that controls each PWM cycle in response to said digital input signal and an output control condition; and further comprising
a weak pull-down device coupled to pull-down said digital output signal unless otherwise driven high by a digital output signal from another regulator.

5. A multiphase power converter, comprising:
a plurality of regulators coupled in a cascade configuration, each comprising:
synchronization logic receiving a clock signal and a digital start input signal from a previous regulator and that provides a digital start output signal to a next regulator in response to said digital start input signal and synchronized with said clock signal;, and
PWN control circuit that controls a PWM output in response to assertion of said digital start input signal and based on meeting an output condition;
a plurality of switching circuits, each having an input coupled to a PWM output of a corresponding one of said plurality of regulators, an output for driving a common DC output voltage, and a sense output provided to a PWM control circuit of said corresponding regulator; and
a controller that senses said DC output voltage and that provides a compensation signal to said PWM control circuit of said corresponding regulator and that provides said clock signal.

6. The multiphase power converter of claim 5, wherein said PWM control circuit comprises:
PWM logic that controls said PWM output based on assertion of said digital start input signal and a reset signal; and
feedback sense logic, coupled to said PWM logic, that asserts said reset signal based on said compensation signal and said sense output of a corresponding one of said plurality of switching circuits.

7. The multiphase power converter of claim 6, wherein said PWM logic comprises gate control logic and at least one driver amplifier.

8. The multiphase power converter of claim 6, wherein said feedback sense logic comprises:
a sense amplifier having an output and an input coupled to said sense output of said corresponding switching circuit; and
a comparator having a first input receiving said compensation signal, a second input coupled to said output of said sense amplifier, and an output that provides said reset signal.

9. The multiphase power converter of claim 5, wherein each of said plurality of switching circuits comprises:
first and second switches having current terminals coupled in series at a junction and having control inputs coupled to said PWM output of said corresponding regulator;
an output inductor coupled between said junction and said DC output voltage; and
a sense circuit that senses current of said output inductor and that provides said sense output.

10. The multiphase power converter of claim 5, wherein said controller comprises:
a sense amplifier having an input coupled to said DC output voltage and an output that provides an output sense signal;
an error amplifier that compares said output sense signal with a reference signal and that provides said compensation signal; and
a clock circuit that generates said clock signal.

11. The multiphase power converter of claim 5, wherein said plurality of regulators comprise N regulators coupled in a daisy-chain configuration, and wherein a selected switching frequency FSW is achieved by programming said clock signal with a frequency of N*FSW.

12. The multiphase power converter of claim 5, further comprising a pull-up device coupled to initially pull high a digital start input signal of a first of said plurality of regulators.

* * * * *